United States Patent
Bezubic, Jr.

(10) Patent No.: US 7,861,476 B2
(45) Date of Patent: *Jan. 4, 2011

(54) CEMENTITIOUS EXTERIOR SHEATHING PRODUCT WITH RIGID SUPPORT MEMBER

(75) Inventor: William Paul Bezubic, Jr., Marshall, MI (US)

(73) Assignee: CertainTeed Corporation, Valley Forge, PA (US)

( * ) Notice: Subject to any disclaimer, the term of this patent is extended or adjusted under 35 U.S.C. 154(b) by 96 days.

This patent is subject to a terminal disclaimer.

(21) Appl. No.: 11/229,913

(22) Filed: Sep. 19, 2005

(65) Prior Publication Data

US 2006/0010800 A1      Jan. 19, 2006

Related U.S. Application Data

(63) Continuation of application No. 10/288,189, filed on Nov. 5, 2002, now Pat. No. 7,028,436.

(51) Int. Cl.
*E04C 2/38* (2006.01)
*E04B 2/00* (2006.01)

(52) U.S. Cl. ............... 52/288.1; 52/449; 52/717.04

(58) Field of Classification Search ............ 52/255, 52/256, 287.1, 288.1, 449, 454, 717.04
See application file for complete search history.

(56) References Cited

U.S. PATENT DOCUMENTS

| | | | | |
|---|---|---|---|---|
| 279,011 A | * | 6/1883 | Phelps | 52/344 |
| 776,344 A | * | 11/1904 | Nielson | 52/316 |
| 1,447,567 A | | 3/1923 | Overbury | |
| 1,495,070 A | | 5/1924 | Finley | |
| 1,732,403 A | | 10/1929 | Harris et al. | |
| 1,787,163 A | | 12/1930 | New | |
| 1,872,185 A | | 8/1932 | Reade | |
| 1,959,960 A | | 5/1934 | Magrath | 18/48 |
| 1,976,947 A | * | 10/1934 | Krauss | 52/596 |
| 2,045,482 A | * | 6/1936 | Maier | 52/316 |

(Continued)

FOREIGN PATENT DOCUMENTS

CA          721719          11/1965

(Continued)

OTHER PUBLICATIONS

Marikunte, et al., Statistical Evaluation of Long-Term Durability Characteristics of Cellulose Fiber Reinforced Cement Composites, ACI Materials Journal/Nov.-Dec. 1994.

(Continued)

*Primary Examiner*—Brian E Glessner
*Assistant Examiner*—Christine T Cajilig
(74) *Attorney, Agent, or Firm*—Duane Morris LLP

(57) ABSTRACT

Cementitious exterior sheathing products are provided which include a rigid support member affixed to a cementitious layer. The rigid support member includes at least one nailing flange disposed along one of its lateral sides for allowing the sheathing product to be affixed to an exterior wall of a building. Preferred mechanical and adhesive bonding techniques are suggested for combining the cementitious layer and rigid support member together to form an integrated product. Such products are lighter in weight and are more crack resistant than currently available fiber cement trim boards.

13 Claims, 5 Drawing Sheets

U.S. PATENT DOCUMENTS

| | | | |
|---|---|---|---|
| 2,089,005 A * | 8/1937 | Sherman et al. | 52/717.04 |
| 2,142,181 A | 1/1939 | Croce | 108/7 |
| 2,149,741 A | 3/1939 | Miles | 20/5 |
| 2,171,010 A | 8/1939 | Schuetz et al. | 108/7 |
| 2,171,155 A * | 8/1939 | Wright, Jr. | 162/117 |
| 2,174,098 A | 9/1939 | Stein | 108/7 |
| 2,187,203 A | 1/1940 | Johnston | 108/8 |
| 2,199,760 A | 5/1940 | Schuetz | 108/7 |
| 2,206,042 A | 7/1940 | Novak | 154/2 |
| 2,238,017 A | 4/1941 | Duncan | 154/2 |
| 2,255,736 A * | 9/1941 | Odell | 52/278 |
| 2,560,521 A | 7/1951 | Camp et al. | 154/86 |
| 2,633,441 A | 3/1953 | Guttress | 154/87 |
| 2,851,873 A * | 9/1958 | Malcolm | 52/262 |
| 2,954,302 A | 9/1960 | Gorman, Jr. | 117/60 |
| 3,185,297 A | 5/1965 | Rutledge | 206/59 |
| 3,284,980 A | 11/1966 | Dinkel | 52/600 |
| 3,289,371 A | 12/1966 | Pearson et al. | 52/338 |
| 3,391,037 A | 7/1968 | McNulty | 156/71 |
| 3,607,486 A | 9/1971 | Jacks et al. | 156/41 |
| 3,608,261 A * | 9/1971 | French et al. | 52/316 |
| 3,766,003 A | 10/1973 | Schuller et al. | 162/156 |
| 3,830,687 A | 8/1974 | Re et al. | 161/168 |
| 3,868,300 A | 2/1975 | Wheeler | 164/124 |
| 3,927,501 A | 12/1975 | Allen et al. | 52/555 |
| 3,929,947 A | 12/1975 | Schwartz et al. | 264/42 |
| 3,935,021 A | 1/1976 | Greve et al. | 106/111 |
| 3,941,632 A | 3/1976 | Swedenberg et al. | 156/71 |
| 3,944,698 A | 3/1976 | Dierks et al. | 428/219 |
| 3,947,398 A | 3/1976 | Williams | 260/29.6 |
| 3,969,567 A | 7/1976 | Occleshaw et al. | |
| 3,993,822 A | 11/1976 | Knauf et al. | 428/213 |
| 4,015,391 A | 4/1977 | Epstein et al. | 52/520 |
| 4,020,237 A | 4/1977 | Von Hazmburg | 428/535 |
| 4,040,851 A | 8/1977 | Ziegler | |
| 4,047,355 A | 9/1977 | Knorr | 52/738 |
| 4,065,333 A | 12/1977 | Lawlis et al. | 156/40 |
| 4,065,597 A | 12/1977 | Gillespie | 428/285 |
| 4,073,997 A | 2/1978 | Richards et al. | 428/285 |
| 4,112,174 A | 9/1978 | Hannes et al. | 428/220 |
| 4,128,699 A | 12/1978 | Kole et al. | 428/498 |
| 4,135,029 A | 1/1979 | Pfeffer | 428/284 |
| 4,148,781 A | 4/1979 | Narukawa et al. | 260/42.51 |
| 4,181,767 A | 1/1980 | Steinau | 428/219 |
| 4,187,130 A | 2/1980 | Kautz | 156/42 |
| 4,195,110 A | 3/1980 | Dierks et al. | 428/218 |
| 4,203,788 A | 5/1980 | Clear | 156/44 |
| 4,242,406 A | 12/1980 | El Bouhnini et al. | 428/236 |
| 4,263,365 A | 4/1981 | Burgess et al. | 428/310 |
| 4,265,979 A | 5/1981 | Baehr et al. | 428/171 |
| 4,277,526 A | 7/1981 | Jackson | |
| 4,288,959 A | 9/1981 | Murdock | 52/518 |
| 4,296,169 A | 10/1981 | Shannon | 428/298 |
| 4,303,722 A | 12/1981 | Pilgrim | 428/213 |
| 4,310,478 A | 1/1982 | Balslev et al. | |
| 4,324,082 A | 4/1982 | Rutkowski et al. | 52/481 |
| 4,335,177 A | 6/1982 | Takeuchi | 428/247 |
| 4,344,804 A | 8/1982 | Bijen et al. | 156/42 |
| 4,344,910 A | 8/1982 | Bijen | 264/257 |
| 4,351,867 A | 9/1982 | Mulvey et al. | 428/70 |
| 4,361,616 A | 11/1982 | Bomers | 428/215 |
| 4,363,666 A | 12/1982 | Johnson et al. | |
| 4,364,212 A | 12/1982 | Pearson et al. | 52/281 |
| 4,366,197 A | 12/1982 | Hanlon et al. | 428/43 |
| 4,378,405 A | 3/1983 | Pilgrim | 428/322.7 |
| 4,403,006 A | 9/1983 | Bruce et al. | 428/70 |
| 4,428,775 A * | 1/1984 | Johnson et al. | 524/4 |
| 4,437,274 A | 3/1984 | Slocum et al. | 52/105 |
| 4,468,909 A | 9/1984 | Eaton | 52/541 |
| 4,477,300 A | 10/1984 | Pilgrim | 156/44 |
| 4,504,533 A | 3/1985 | Altenhofer et al. | 428/70 |
| 4,506,060 A | 3/1985 | White, Sr. et al. | 525/163 |
| 4,543,159 A | 9/1985 | Johnson et al. | |
| 4,571,356 A | 2/1986 | White, Sr. et al. | 428/143 |
| 4,637,860 A | 1/1987 | Harper et al. | 162/117 |
| 4,647,496 A | 3/1987 | Lehnert et al. | 428/251 |
| 4,664,707 A | 5/1987 | Wilson et al. | 106/18.11 |
| 4,681,802 A | 7/1987 | Gaa et al. | 428/288 |
| 4,722,866 A | 2/1988 | Wilson et al. | 428/411.1 |
| 4,810,569 A | 3/1989 | Lehnert et al. | 428/285 |
| 4,810,576 A | 3/1989 | Gaa et al. | 428/391 |
| 4,811,538 A | 3/1989 | Lehnert et al. | 52/455 |
| 4,902,347 A * | 2/1990 | Soroushian et al. | 524/5 |
| 5,148,645 A | 9/1992 | Lehnert et al. | 52/443 |
| 5,220,762 A | 6/1993 | Lehnert et al. | 52/408 |
| 5,241,795 A * | 9/1993 | Giroux et al. | 52/503 |
| 5,319,900 A | 6/1994 | Lehnert et al. | 52/408 |
| 5,342,680 A | 8/1994 | Randall | 428/285 |
| 5,347,784 A * | 9/1994 | Crick et al. | 52/520 |
| 5,371,989 A | 12/1994 | Lehnert et al. | 52/309.17 |
| 5,397,631 A | 3/1995 | Green et al. | 428/219 |
| 5,401,588 A | 3/1995 | Garvey et al. | 428/703 |
| 5,433,048 A | 7/1995 | Strasser | |
| 5,439,518 A | 8/1995 | Francis et al. | 106/705 |
| 5,501,056 A | 3/1996 | Hannah et al. | 52/748.1 |
| 5,601,888 A | 2/1997 | Fowler | 428/34 |
| 5,614,307 A | 3/1997 | Andersen et al. | 428/294.7 |
| 5,625,986 A * | 5/1997 | Mansfield et al. | 52/255 |
| 5,641,584 A * | 6/1997 | Andersen et al. | 428/703 |
| 5,644,880 A | 7/1997 | Lehnert et al. | 52/408 |
| 5,685,116 A * | 11/1997 | Bradshaw et al. | 52/311.1 |
| 5,694,728 A * | 12/1997 | Heath et al. | 52/554 |
| 5,704,179 A | 1/1998 | Lehnert et al. | 52/408 |
| 5,718,785 A | 2/1998 | Randall | 156/39 |
| 5,772,846 A | 6/1998 | Jaffee | 162/145 |
| 5,791,109 A | 8/1998 | Lehnert et al. | 52/309.17 |
| 5,799,446 A | 9/1998 | Tamlyn | |
| 5,830,548 A | 11/1998 | Andersen et al. | 428/36.4 |
| 5,836,123 A * | 11/1998 | Gulino | 52/288.1 |
| 5,881,502 A | 3/1999 | Tamlyn | |
| 5,897,108 A | 4/1999 | Gordon et al. | 269/50 |
| 5,906,364 A | 5/1999 | Thompson et al. | 269/22 |
| 5,945,182 A | 8/1999 | Fowler et al. | 428/34 |
| 5,960,598 A | 10/1999 | Tamlyn | |
| 5,981,406 A | 11/1999 | Randall | 442/71 |
| 5,985,061 A | 11/1999 | Doi et al. | |
| 5,993,303 A | 11/1999 | Fladgard et al. | 451/356 |
| 6,001,169 A | 12/1999 | Kawai | |
| 6,018,924 A | 2/2000 | Tamlyn | |
| 6,029,966 A | 2/2000 | Hertz et al. | 269/266 |
| 6,258,190 B1 | 7/2001 | Sciarrino et al. | |
| 6,276,107 B1 | 8/2001 | Waggoner et al. | 52/554 |
| 6,293,534 B1 | 9/2001 | Leban | 269/309 |
| 6,338,229 B1 * | 1/2002 | Botzen | 52/371 |
| 6,341,458 B1 | 1/2002 | Burt | 52/287.1 |
| 6,346,146 B1 | 2/2002 | Duselis et al. | |
| 6,354,049 B1 | 3/2002 | Bennett | 52/287.1 |
| 6,358,585 B1 | 3/2002 | Wolff | 428/36.6 |
| 6,367,222 B1 | 4/2002 | Timbrel et al. | 52/555 |
| 6,506,248 B1 | 1/2003 | Duselis et al. | |
| 6,510,667 B1 | 1/2003 | Cottier et al. | |
| 6,591,566 B1 * | 7/2003 | Rodlin | 52/311.1 |
| 6,625,950 B1 | 9/2003 | Shreiner et al. | |
| 6,684,597 B1 | 2/2004 | Butcher | |
| 6,705,052 B1 | 3/2004 | Larson | |
| 7,028,436 B2 * | 4/2006 | Bezubic, Jr. | 52/288.1 |
| 2003/0226327 A1 * | 12/2003 | Perry | 52/287.1 |

FOREIGN PATENT DOCUMENTS

| | | |
|---|---|---|
| CA | 794590 | 9/1968 |
| CA | 993779 | 7/1976 |
| DE | 1 033 133 B1 | 6/1955 |
| DE | 1 509 853 B1 | 4/1963 |

| | | |
|---|---|---|
| DE | 1 223 287 B1 | 8/1965 |
| DE | 28 08 723 A1 | 3/1979 |
| DK | 3679/80 | 8/1980 |
| EP | 0 148 760 A2 | 7/1985 |
| EP | 0 148 761 A2 | 7/1985 |
| EP | 0 263 723 | 4/1988 |
| GB | 772 581 A | 4/1957 |
| GB | 1 204 541 A | 9/1970 |
| GB | 1 520 241 A | 9/1978 |
| GB | 2 004 807 A | 4/1979 |
| GB | 2 103 563 A | 2/1983 |
| JP | 2141484 A2 | 5/1990 |
| JP | 3208871 A2 | 9/1991 |
| JP | 03337538 | 11/1991 |
| JP | 04189937 | 6/1992 |
| JP | 04189938 | 6/1992 |
| JP | 5147997 A2 | 6/1993 |
| JP | 6001679 A2 | 1/1994 |
| JP | 6008219 A2 | 1/1994 |
| JP | 7187748 A2 | 7/1995 |
| JP | 2001-180997 | 3/2001 |
| WO | WO9957392 A1 | 11/1999 |

OTHER PUBLICATIONS

F. Bakula, et al., The Study of Autoclaved Cellulose Fiber-Reinforced Cement Composites, Cement and Concrete Research, vol. 25, No. 1, pp. 71-78, 1995.

Wierman, et al., The Effects of Pressure on the Freeze-Thaw Durability of Fiber-Reinforced Cement Board, pp. 1-14.

Cedar Valley Handy Panels, Cedar Valley Shingle Systems, 1998, Trade Literature.

Cemtrim Premium Fiber-Cement Trim, Trade Literature.

Azek Trimboards, Vycom Corp. Trade Literature.

Royal Wood® Precision Composites, Inc. Trade Literature.

HardiTRIM HLD™ Technology Exterior Trim, James Harding Siding Products, 1999,Trade Literature.

Active Minerals Company LLC, Acti-Gel™208 Features & Benefits, Jan. 15, 2002, Trade Literature.

James Hardie Siding Products, Fact Sheet James Hardie Building Products U.S. Siding Operations and Products, Apr. 25, 2002, Trade Literature.

What's New, James Harding Building Products Buys Cemplank Plants, Cemplank, Apr. 25, 2002, Trade Literature.

Multishake, MaxiTile, Apr. 25, 2002, Trade Literature.

MIRATEC™ Treated Exterior Composite TRIM, Trade Literature.

American Classics, Maibec, Trade Literature.

TruWood® Manufactured by Collins Products LLC Siding, Trade Literature.

Snapper Siding is Really Great Shakes, Pacific International Siding Co., Trade Literature.

Technical Bulletin 2004, Fancy Cuts Panel, Shakertown 1992, Inc., Trade Literature.

Cement Boards, NERAC, Inc., Jun. 20, 2002.

Owens Coming Exterior System, Sep. 10, 2000, Trade Literature.

Cedar Valley Shingle Siding Panels, Cedar Valley Shingle Systems, 1999, Trade Literature.

Rhoplex®E-330 Cement Mortar Modifier, Rohm and Haas Company, 1997, Trade Literature.

Weather Boards, Fibercement Siding, CertainTeed, Nov. 2001, Trade Literature.

SYTON® HT-50 Colloidal Silica Slurry, DA NanoMaterials, LLC Trade Literature, Feb. 2007, pp. 1-2.

Colloidal Technologies Investment Casting, Nalco Trade Literature, Jun. 2008, p. 1.

Sylica Additives, Nyacol® Nano Technolocits, Inc. Trade Literature, Jun. 2008, pp. 1-3.

Colloidal Silica, W.R. Grace Trade Literature, Jun. 2008, p. 1.

M5 Cab-o-Sil Thickening Agent for Fluids, Eager Polymers Trade Literature, 2006, pp. 1-2.

SYLOID® Silica Grades, W.R. Grace Trade Literature, 2006, pp. 1-2.

Lo-Vel™ TM Flatting Agents, Non-Treated, PPG Silica Products Trade Literature, Apr. 2007, pp. 1-2.

Hi-Sil™ TM Thickening Agents, PPG Silica Products Trade Literatue, Apr. 2007, pp. 1-2.

Haynes, John D., Letter to Anthony J. Fitzpatrick dated May 16, 2008, pp. 1-10.

* cited by examiner

CEMENTITIOUS EXTERIOR SHEATHING PRODUCT WITH RIGID SUPPORT MEMBER

FIELD OF THE INVENTION

This application is a continuation of U.S. application Ser. No. 10/288,189, filed Nov. 5, 2002, now U.S. Pat. No. 7,028, 436. This invention relates to exterior sheathing products which incorporate cementitious materials, and especially, fiber cement sheathing which is lighter and more resistant to cracking when fastened to the exterior walls of buildings.

BACKGROUND OF THE INVENTION

Fiber cement has been used in the United States building materials industry since the 1980's. This material is used in residential and commercial construction applications as an alternative to wood for siding, roofing, backer board, trim and fascia applications. Fiber cement is fire and insect resistant, and is more durable. In fact, it was the fastest growing market segment in the exterior sheathing industry in the 1990's, and by 2005, this material is expected to gain up to 25 percent of the siding market.

Fiber cement is, technically, a composite of portland cement, aggregate (usually sand), and cellulose fibers. Cellulose fibers are added to cement to increase its toughness and crack-arresting ability. Fiber cement shingle and shake products are widely available from such sources as James Hardie, Inc. under the brand name Hardiplank® and CertainTeed Corporation under the brand name Weatherboards™. These products are produced by the Hatchek de-watering process, which results in a laminated flat sheet reinforced with a significant amount of cellulose fibers, usually about 30-35 percent by volume.

Fiber cement materials possess useful properties, but they were at one point in their history believed to be unsuitable for exterior use since they were susceptible to damage due to the effect of freeze-thaw cycles. See Harper et al., U.S. Pat. No. 4,637,860. Freeze-thaw action can cause severe deterioration to fiber cement building products. The primary cause of damage is due to the hydraulic pressures that develop as water freezes and expands in tiny fissures and pores of cementitious materials. Once these forces exceed the strength of the material, cracking occurs. During subsequent thawing, the water then moves through the cracks, expanding them further, to cause more damage when freezing occurs again.

Harper et al., U.S. Pat. No. 4,637,860, suggested that better freeze-thaw resistance could be achieved by autoclaving a cellulose fiber cement mixture with silica sand additions. These inventors also recognized that silica sand additions reduced the density of formed sheet materials to a level below that necessary to achieve sufficient strength and freeze-thaw resistance. Accordingly, the '860 patent suggested compressing the wet mixture in a press to reduce its thickness and increase its density prior to autoclaving. Such a process has been proven to be effective in increasing the interlaminar bond strength ("ILB") of fiber cement boards when pressures approaching 30 bar are used. See Wierman et al., "The Effects of Pressure on Freeze-Thaw Durability of Fiber-Reinforced Cement Board" (September, 2002).

While improvements to the processing of fiber cement sheathing have been introduced, there have been some notable disadvantages associated with fiber cement products compared to vinyl siding products. Specifically, even with cellulose fiber reinforcement, fiber cement panels and trim boards are susceptible to cracking by nails and screws, especially along their edges. Moreover, fiber cement trim boards are far heaver than their vinyl counterparts, and can be difficult to handle.

Accordingly, there is a current need in the cementitious exterior sheathing industry for a lighter weight, more crack resistance, and therefore, more durable siding and trim panel.

SUMMARY OF THE INVENTION

The present invention provides, in a first embodiment, a cementitious exterior sheathing product, including a rigid support member having a wall-facing side and an exterior-facing side. The rigid support member also includes a pair of lateral sides, a pair of longitudinal ends, and at least one nail flange disposed along one of its lateral sides. Disposed on a portion of the exterior-facing side of the rigid support member is a cementitious layer which exhibits an aesthetic appearance.

The cementitious exterior sheathing products and fiber cement trim boards of this invention can be provided in reduced thicknesses, of about 0.31 in., for example, which would be significantly lighter, and easier to carry than the 1 inch thickness trim boards currently provided in the marketplace. By transferring the load to a rigid support member, the cementitious trim boards of this invention can be made as much as 50% lighter than currently available fiber cement trim boards. The rigid support members of this invention are preferably provided with fastener receiving holes so that they, and not the fiber cement material, absorb the stress of hammering.

The preferred rigid support members of this invention include resinous or metallic materials which act as a reinforcement to the cementitious layers. These materials, while rigid and possessing a greater flexural modulus than fiber cement, can, nevertheless, be pre-perforated, perforated by the fasteners used to hang the trim boards, or provided as a lath structure, to enable nail or screw fastening with minimal stress, as well as, provide mechanical locking or bonding between the cementitious material and the rigid support. Additionally, cement bond promoters, such as polyvinyl-acetate ("PVA") and acrylic coatings, may be used to provide an adhesive bond between the cementitious layers and the rigid support members of this invention.

In a further embodiment of this invention, a fiber cement trim board is provided which includes an elongated rigid support member having a wall-facing side and an exterior-facing side, a pair of lateral side portions and a pair of longitudinal ends. The exterior-facing side of the rigid support member includes at least a first and a second exterior wall portion. Disposed along a first of the pair of lateral side portions of the rigid support member is a first nailing flange, and a fiber cement layer is disposed on a portion of the exterior-facing side of the rigid support member. The fiber cement layer exhibits an aesthetic appearance. In the preferred embodiment, the fiber cement layer is a corner trim board.

BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

Cementitious exterior sheathing products, such as lap siding, shingles, panels, planks, vertical siding, soffit panels, fascia, corner post, column corners and trim boards, are provided by this invention. As used herein, "cementitious" refers to hydraulically settable materials, including a hydraulically settable binder, such as hydraulic cement, gypsum hemihydrate, and calcium oxide, and water to which components such as aggregates, fibers, dispersants and a rheology-modifying agents can be selectively added to modify the properties of the mixture. The term "fiber cement" refers to a cementitious composition including portland cement, cellulose fibers and sand.

Figure 1:
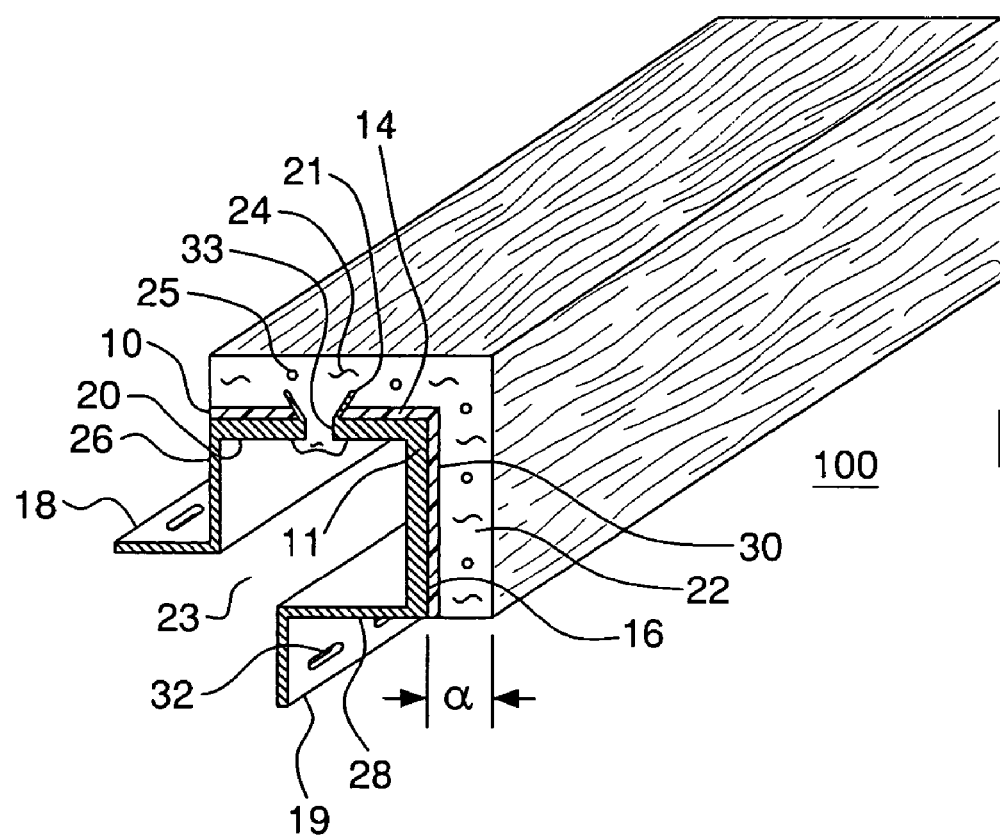
FIG. 1: is a front perspective view of a corner trim board of this invention.
Figure 2:
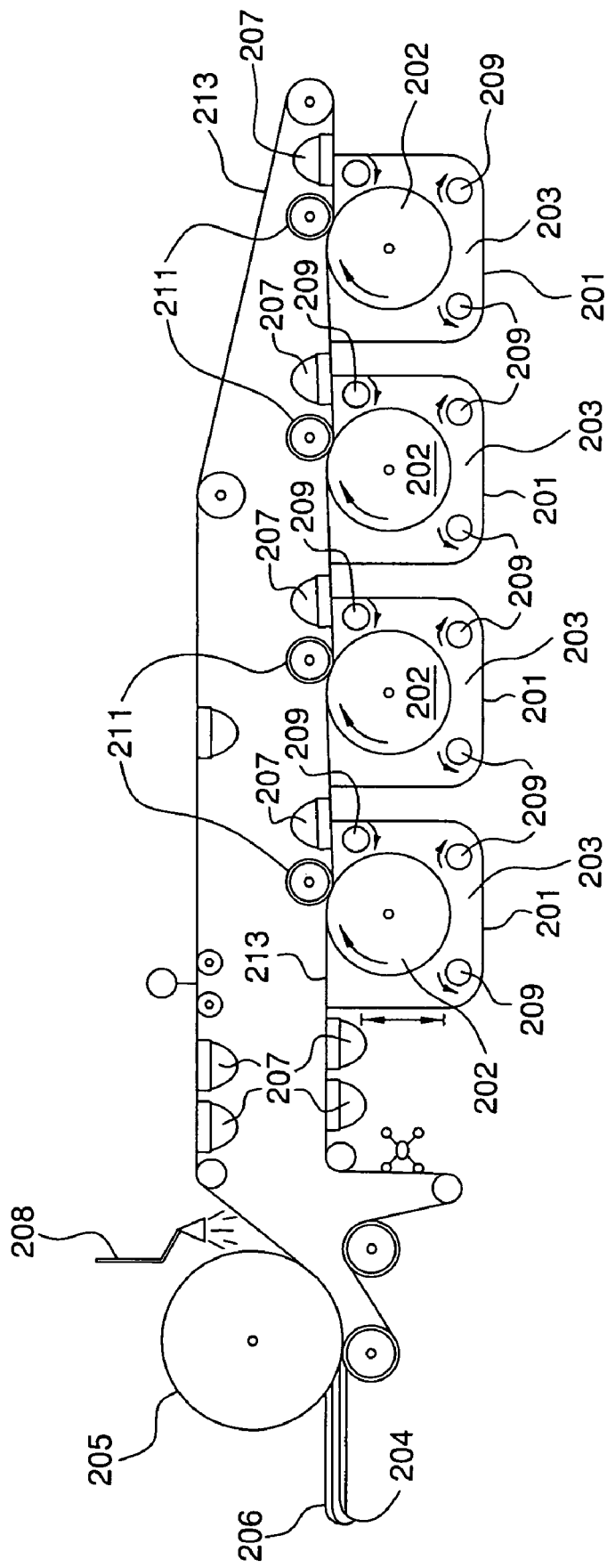
FIG. 2: is a diagrammatic, partial view of a manufacturing technique, including the de-watering of a plurality of cementitious layers.
Figure 3:
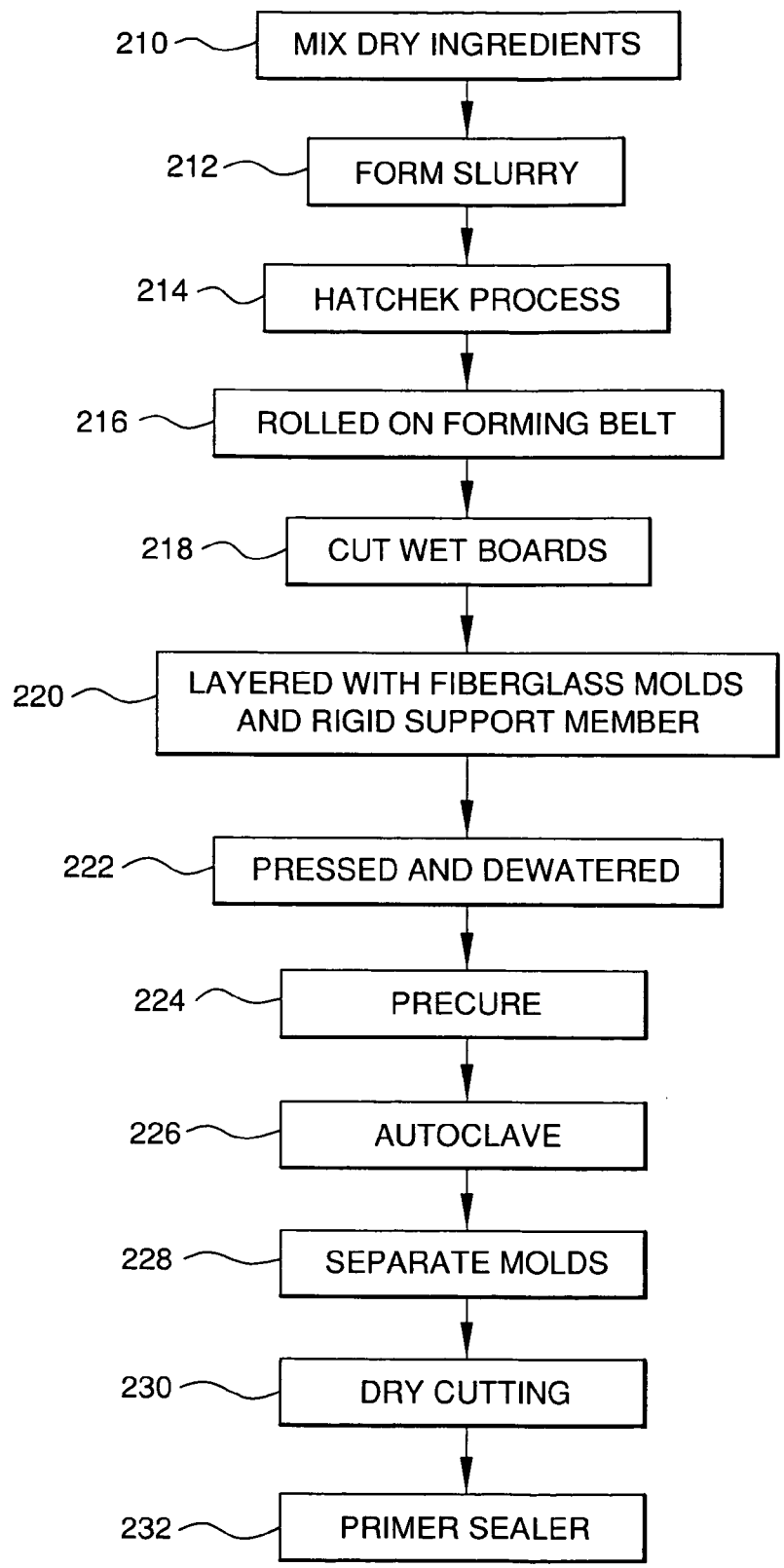
FIG. 3: is a flow diagram of a preferred Hatchek and pressing process for manufacturing the trim board and sheathing products of this invention.

With reference to the figures, and particularly FIGS. 1-3 thereof, a process for making cementitious exterior sheathing products, such as a corner trim board 100, is disclosed. In a first embodiment of this invention, shown in FIG. 1, a corner trim board 100, is provided. The corner trim board 100 includes an elongated rigid support member 11 having a wall-facing side 20 and an exterior-facing side 10, a pair of lateral side portions and a pair of longitudinal ends. The exterior-facing side 10 includes at least a first and a second exterior wall portion 14 and 16, respectively. The corner trim board 100 further includes a first nailing flange 18 disposed along at least a first of the pair of lateral side portions, and a cementitious layer 22, preferably made from fiber cement, disposed at least on a portion of the exterior-facing side 10 of the rigid support member 11. The cementitious layer 22 exhibits an aesthetic appearance, such as a wood grain. The cementitious layer 22 can also take the shape of decorative panels, including lap and full cut designs with deep, authentic textures, such as lap shingles, random square straight edges, random square staggered edges, half rounds, and octagons.

The corner trim board 100 can further include a second nailing flange 19, the first and second nailing flanges 18 and 19 having disposed therethrough a plurality of fastener receiving holes 32. The fastener receiving holes 32 are desirably elongated slots through the rigid support member 11, although with some sacrifices, fastener holes can also, or alternatively, be located through the cementitious layer 22. The corner trim board 100 further includes, in this embodiment, third and fourth exterior wall portions 26 and 28 connected to the first and second exterior wall portions 14 and 16 respectively. The first, second, third and fourth exterior wall portions 14, 16, 26 and 28 are desirably arranged such that the first and fourth wall portions 14 and 28 are substantially parallel and the second and third wall portions 16 and 26 are substantially parallel. More preferably, the first nailing flange 18 is also substantially parallel to the first wall portion 14 and a second nailing flange 19 is substantially parallel to the second exterior wall portion 16, in this embodiment.

Alternatively, the rigid support member can take the form of a rectangular enclosure having first and second pairs of generally parallel walls (14, 28 and 16, 26 respectively), and a longitudinal slotted opening 23.

The cementitious layer 22 is disposed at least over the exterior-facing side 10 of the rigid support member 11, preferably prior to pressing and autoclaving. A good mechanical bond can be provided between the rigid support member 11 and the cementitious layer 22 by perforating the rigid support layer with through-holes 33 which allow the wet cementitious material to bulge through the rigid support member 11, as shown in FIG. 1., and following setting, provide it with a mechanically locking engagement. A plurality of like through-holes can be uniformly distributed through the first and second exterior wall portions 14 and 16, for example. Alternatively, or additionally, a resinous cementitious bond promoter 30 can be applied to any surface of the rigid support member II intended to be in contact with the cementitious layer 22, such as the first and second exterior wall portions 14 and 16, to promote an adhesive bond with the cementitious layer 22. Cementitious bond promoters include PVA and acrylic formulations, such as the acrylic-based cement mortar modifier Rhoplex® E-330, available from Rohm & Haas Company, Philadelphia, Pa. Additionally, the through-holes 33 can be punched through metal sheet or plate so as to provide one or more extending prongs 21 which can further aid in the mechanical locking of the cementitious layer 22 to the rigid support member 11 by extending into the cementitious layer 22 prior to curing.

The preferred corner trim board 100 of this invention enables the use of thinner cementitious materials than those formerly suggested for corner trim applications. The corner trim board 100 of this invention can include, for example, an cementitious layer 22 which is approximately at least about 0.05 inches, preferably about 0.25-0.75 inches, and more preferably about 0.31-0.63 inches in thickness, as opposed to as much as one inch thick prior art constructions. Additionally, since the fastener receiving holes 32 are preferably located in the rigid support member 11, nailing can be accomplished without risking the development of cracks or overstressed areas in the cementitious layer 22. The corner trim board 100 of this invention can be designed to save at least 10 percent of the weight, and as much as 50 percent of the weight, of conventional trim board constructions without sacrificing strength or durability. In fact, due to the mechanical and/or adhesive bonding between the rigid support member 11 and cementitious layer 22, and the potential for "re-bar"-like reinforcement of the cementitious layer 22, the present construction may be even stronger.

With regard to the process for manufacturing trim boards and sheathing products of this invention, reference is now made to FIGS. 2-7. The steps for manufacturing fiber cement are well known. First, the dry ingredients are mixed thoroughly in a mixing step 210 of FIG. 3. These ingredients typically include, aggregates, fibers, dispersants, and a hydraulically settable binder, such as cement. A typical construction will include portland cement, sand, cellulose fibers, kaolin and performance additives in less than one percent by weight. These dry ingredients are next mixed with water and formed into a slurry at step 212. The slurry 203, shown in FIG. 2, is deposited by displacement screws to a series of tanks 201 which are fluidly connected to a series of transfer (or pick up) rolls 202. Agitators 209 disposed in the tanks 201 help to mix the fiber cement slurry 203 to keep the ingredients from settling. The transfer rolls 202 and pressure rolls 211 apply a thin layer of slurry 203 to the felt belt 213. As this belt 213 passes by each tank 201 it "picks up" a little more slurry until the full wet thickness of each layer 204 is achieved.

The Hatchek process 214 includes a dewatering station or vacuum box 207 for de-watering each layer 204 of cementitious material and an accumulator roll 205 for assembling the layers together into about a 0.25-0.75 inch, preferably about 0.31-0.63 inch (dry cured thickness), multi-layered sheet 206. The cementitious sheet 206 is roll formed at step 216 through one or more further nip rolls or belts, followed by a cutting step 218. In a preferred embodiment, the multi-layered sheet 206 is wet or shear cut at step 216 to provide a 5 ft. wide×12 ft. long sheet dimension. The cutting step 216 can be accomplished by a water jet or cutting knife 306 as shown in FIG. 4.

Figure 4:
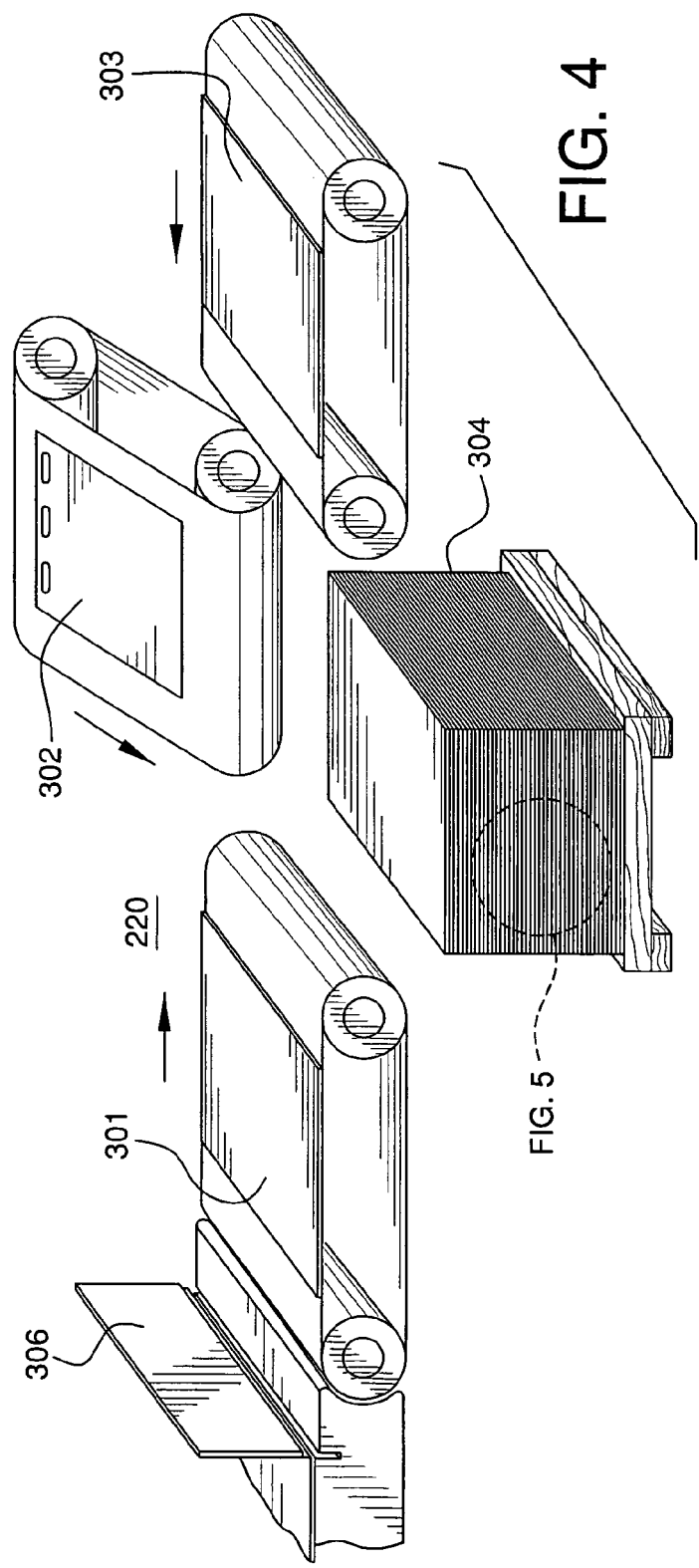
FIG. 4: is a diagrammatic front perspective view of the stacking of fiberglass molds, wet cement boards and rigid support members, prior to pressing.
Figure 5:
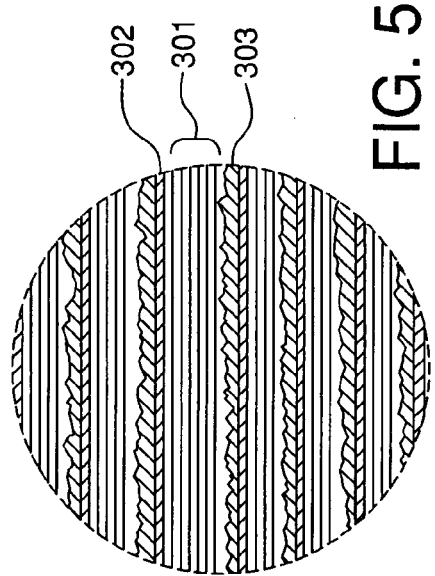
FIG. 5: is a partial cross-sectional side view of a portion of the stacked structure of FIG. 4, showing the alternate layers of fiber cement, fiberglass mold and rigid support members.

At the layering step 220, which is diagrammatically illustrated in FIGS. 4 and 5, the rigid support member 302 and suitable fiberglass mold 303, containing, for example, an aesthetic wood grain or the like, are joined with the cut board 301 in a stack 304.

Figure 6:
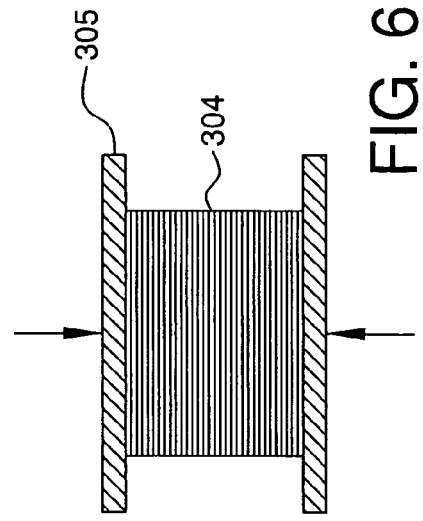
FIG. 6: is a diagrammatic side view of a pressing operation.

The pressing and final de-watering of the product is accomplished at step 222, shown also in FIG. 6, in which great pressures of about 500 psi (30 bar) are applied by a 16,000 ton press for approximately one hour. The pressing and de-watering step 222 should be sufficient to squeeze water out of the cementitious material and impress an ornamental appearance from the fiberglass mold 303 into the cut board 301.

The disclosed Hatchek process 214, can be modified to introduce an interlaminar bond strength ("ILB") promoter through spray head 208. Such an ILB strength promoter could include, for example, a cement mortar modifier or adhesive, such as acrylic, or PVA, such as the aforementioned Rhoplex® E-330, for assisting in promoting better adhesion between the layers 204 of the multilayered sheet 206. Alternatively, or additionally, a rheological agent, such as "nanosized" magnesium alumino silicate, can be sprayed onto the fiber cement layer prior to sheet formation at the accumulation roll 205, to encourage flow between the individual cementitious layers 204 to create better interlaminar bond strength. One rheology-modifying agent used to produce such an effect is the Acti-gel™ brand of activated magnesium alumino silicate available from Active Minerals Company LLC, Hunt Valley, Md. Such rheological agents and cement adhesive promoters can also be added to the slurry 203 in the tank 201, or during initial mixing of the slurry 203 ingredients, or through a combination of these techniques.

Figure 7:
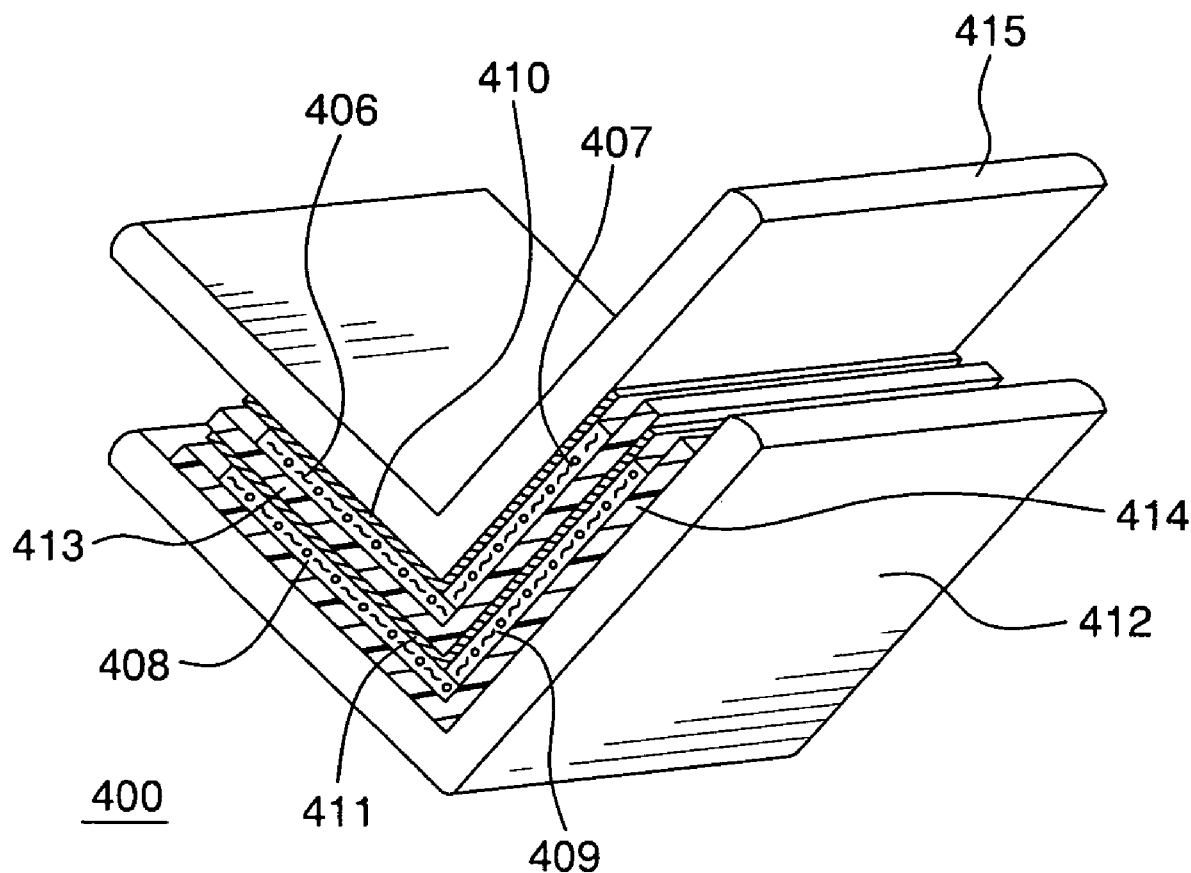
FIG. 7: is a diagrammatic side perspective view of a pressing operation for a corner trim board.

In connection with the corner trim board 100 of this invention, an alternate press operation 400 is shown in FIG. 7. In this operation 400, a plurality of 4 inch wide by foot long strips of fiber cement board, such as the first set of fiber cement board strips 406, 407 and second set of fiber cement board strips 408 and 409, are transferred into a stack and layered between the first and second V-shaped fiberglass molds 412, 413 and first and second V-shaped rigid support members 410, 411. The stack is introduced between a pair of V-shaped steel platens, 414, 415 and the press is activated to combine the board strips together into a bonded corner having a imprinted aesthetic surface thereon. This process may be used to make one, or a plurality of corner trim boards 100 of this invention. Following the pressing operation 400, the nailing flanges 18 and 19 can be formed in a break or the like.

Following the pressing and de-watering step 222, the stack 304 of formed boards, fiberglass molds 303 and support members 302 are pre-cured at step 224 in an oven for 12 hours at 140° F. and 100% humidity. The pre-curing step 224 provides the now formed cementitious boards with sufficient mechanical properties to be transferred. At this stage the cementitious product is about 15-20% cured. It is then subjected to a final autoclaving step 226 for 12 hours at 325° F. in a saturated steam environment. The autoclaving step 226 should be sufficient to substantially cure the cementitious product to about a 99.9% cure. Following the autoclaving step 226, the board is separated from the molds at step 228, and then sent to inventory for a week or two prior to the dry cutting step 230. Dry cutting is typically accomplished with a gang saw including about 10 blades which are capable of cutting multiple products or making multiple cuts in a single product. In this fashion, scallops, staggered edges and individual shapes can be cut into the cementitious material to provide an aesthetic appearance. Wet cutting with water jet is also suitable for this purpose.

Following the dry cutting step 230, the cementitious product is sealed and primed at step 232. A good PVA or acrylic latex primer coat followed by a tinted finish coat helps to provide the corner trim board 100 with years of weatherability.

While the steps enumerated in the flow diagram of FIG. 3 have been successful in producing the cementitious products and corner trim boards 100 of this invention, it will be realized that these steps can be modified or changed from their selected sequence while still providing a quality product. For example, cutting could occur in the wet or green state, as opposed to a final cured state of the product to provide trim details such as circles, cuts between shapes and product edges. The pressing step 222 could be eliminated in favor of mold or belt curing or the like. The autoclave and separate mold steps 226 and 228 could be reversed for example, and as an alternative to the Hatchek process, molding processes could be employed, and an extruder could be used instead of an accumulation roll.

Materials Discussion

The following preferred materials have been selected for manufacturing the cementitious products of this invention.

In the preferred embodiment, the rigid support member 11 includes a rigid polymer resin, such as, rigid polyvinyl chloride ("pvc"), fiberglass-reinforced epoxy or polyester, or a metal plate, sheet or lath. Suitable metallic materials include anodized or polymer-coated aluminum or copper, brass, bronze, stainless steel, or galvanized steel, in plate, sheet or lath form. If aluminum is selected, it should be coated wherever it comes in contact with the cementitious material of this invention, since it is prone to attack by alkali compositions. Similarly, carbon steel selections should be coated or galvanized in order to prevent rusting, especially in the first and second nailing flanges 18 and 19. The metal plate or lath can be roll formed and punched in order to provide through-holes 33 and fastener receiving holes 32. If a lath, scrim, or mesh construction is used, separate holes may not be necessary since the open construction of a lath, scrim, or mesh is ideal for mechanically locking with the cementitious layer 22 and is easily penetrated by fasteners such as nails and screws. With lath or scrim constructions, embedding within the cementitious layer 22 is an option, in which case, the rigid support member may contain corrugations, grooves perforations or ridges to assist in mechanically locking with the cementitious layer 22.

Aggregates 25, fibers 24, dispersants, and a rheology-modifying agents can be selectively added to modify the properties of the cementitious layer 22. The cementitious layer 22 most preferably includes a known fiber cement composition including wood fiber, silica sand and portland cement, with or without an acrylic modifier. A variety of additives can be included within the cementitious layer 22, such as organic binders, dispersants, one or more aggregate materials 25, fibers 24, air entraining agents, blowing agents, or reactive metals. The identity and quantity of any additive will depend on the desired properties or performance criteria of both the cementitious layer 22 as well as the sheathing or trim product made therefrom.

Organic binders are simply polymers that when added to water under certain conditions form long chains that intertwine and capture the components of the mixture. As water is removed from the mixture, these long chains solidify and bind the structural matrix. Because of the nature of these organic binders, however, they also function to modify the rheology of a composition. Whether the organic material is a binder, or primarily affects the rheology is a matter of degree and is dependent on the concentration. In smaller amounts the organic material primarily affects the rheology. As the amount of organic material is increased, its ability to bind the particles together increases, although it also continues to affect the rheology.

Organic binders can also be added to increase the cohesive strength, "plastic-like" behavior, and the ability of the mixture to retain its shape when molded or extruded. They act as thickeners and increase the yield stress of the inorganically filled mixture, which is the amount of force necessary to deform the mixture. This creates high "green strength" in the molded or extruded product. Suitable organic binders include a variety of cellulose-, starch-, and protein-based materials (which are generally highly polar), all of which assist in bridging the individual particles together.

Dispersants, on the other hand, act to decrease the viscosity and the yield stress of the mixture by dispersing the individual aggregates 25, fibers 24, and binding particles. This allows for the use of less water while maintaining adequate levels of workability. Suitable dispersants include any material which can be absorbed onto the surface of the binder particles or aggregates and which act to disperse the particles, usually by creating a charged area on the particle surface or in the near colloid double layer. The binders and dispersants can be introduced in the dry mixing step 210, slurry forming step 212 and/or sprayed between layers 204 by a spray head 208 onto the accumulator roll 202, for example.

It may be preferable to include one or more aggregate materials within the cementitious layer 22 in order to add bulk and decrease the cost of the mixture. Aggregates often impart significant strength properties and improve workability. An example of one such aggregate is ordinary silica sand or clay, which are completely environmentally safe, extremely inexpensive, and essentially inexhaustible.

In other cases, lightweight aggregates can be added to yield a lighter, and often more insulating, final product. Examples of lightweight aggregates are perlite, vermiculite, hollow glass spheres, aerogel, xerogel, pumice, and other lightweight rocklike materials. These aggregates are likewise environmentally neutral and relatively inexpensive.

Fibers may be added to the cementitious layer 22 in order to increase the interlaminar bond strength, compressive, tensile, flexural, and cohesive strengths of the wet material as well as the hardened articles made therefrom. Fiber should preferably have high tear and burst strengths (i.e., high tensile strength), examples of which include waste paper pulp, abaca, southern pine, hardwood, flax, bagasse (sugar cane fiber), cotton, and hemp. Fibers with a high aspect ratio of about 10 or greater work best in imparting strength and toughness to the moldable material.

From the foregoing, it can be realized that this invention provides reinforced cementitious sheathing products which are lighter in weight and more resistant to cracking than currently available commercial fiber cement products. The preferred corner trim board of this invention can use less than half of the cementitious material of a conventional trim board, but since it is reinforced with a rigid support member, it will be easier to work with and provide potentially greater durability. The cementitious layers of this invention can be joined to the rigid support member with mechanical and/or adhesive bonds, and the individual layers of the cementitious products of this invention can be further reinforced with rheological modifying agents to increase ILB strength by allowing fibers to displace and flow better across the laminated boundaries of the cementitious materials, or by adding mortar or cement bonding agents for adhesively bonding these layers together, or both. Although various embodiments have been illustrated, this is for the purpose of describing, and not limiting the invention. Various modifications, which will become apparent to one skilled in the art, are within the scope of this invention described in the attached claims.

What is claimed:

1. An exterior sheathing product comprising:
a board of fiber cement material attached to a first wall and a second wall of a support member;
the support member having a first nailing flange and fastener receiving holes through the first nailing flange;
the support member having a second nailing flange and further fastener receiving holes through the second nailing flange, wherein the first wall and the second wall are between the first nailing flange and the second nailing flange, and wherein the board is attached to and covers the first wall and the second wall, while the fastener receiving holes and the further fastener receiving holes are uncovered by the board to receive fasteners;
a cementitious bond promoter disposed on an exterior-facing side of said support member;
the board of fiber cement material including a multilayered sheet; and
an interlaminar bond strength promoter for adhesion between layers of the multilayered sheet.

2. The exterior sheathing product of claim 1, comprising:
a shape cut into the board to provide a desired appearance.

3. The exterior sheathing product of claim 1, comprising:
the first wall and the second wall being perforated with through-holes mechanically locking with the fiber cement material.

4. The exterior sheathing product of claim 1, comprising:
the first wall and the second wall being perforated with through-holes mechanically locking with the fiber cement material; and
prongs adjacent to the through-holes, wherein the prongs are imbedded in the board.

5. The exterior sheathing product of claim 1, comprising:
the first wall and the second wall comprising a mesh or scrim mechanically locking with the fiber-cement material.

6. The exterior sheathing product of claim 5 wherein,
the further fastener receiving holes are uncovered by the board to receive fasteners without development of cracks or over-stressed areas in the board.

7. The exterior sheathing product of claim 5, comprising:
a shape cut into the board to provide a desired appearance.

8. The exterior sheathing product of claim 5, comprising:
the first wall and the second wall being perforated with through-holes mechanically locking with the fiber cement material.

9. The exterior sheathing product of claim 5, comprising:
the first wall and the second wall being perforated with through-holes mechanically locking with the fiber cement material; and prongs adjacent to the through-holes, wherein the prongs are imbedded in the board.

10. The exterior sheathing product of claim 5 wherein the fiber cement material comprises a multi-layered sheet.

11. The exterior sheathing product of claim 5, comprising: a third wall between the first wall and the first flange, and a fourth wall between the second wall and the second flange.

12. The exterior sheathing product of claim 1 wherein the fiber cement material comprises a multi-layered sheet.

13. The exterior sheathing product of claim 1, comprising: a third wall between the first wall and the first flange, and a fourth wall between the second wall and the second flange.

* * * * *